(12) United States Patent
Yoneda et al.

(10) Patent No.: US 11,271,443 B2
(45) Date of Patent: Mar. 8, 2022

(54) ROTOR CORE

(71) Applicant: AISIN SEIKI KABUSHIKI KAISHA, Kariya (JP)

(72) Inventors: Takahiro Yoneda, Kariya (JP); Toshiya Sugiyama, Kariya (JP); Akifumi Kurokawa, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 209 days.

(21) Appl. No.: 16/585,141

(22) Filed: Sep. 27, 2019

(65) Prior Publication Data
US 2020/0106315 A1 Apr. 2, 2020

(30) Foreign Application Priority Data

Oct. 2, 2018 (JP) .............................. JP2018-187633

(51) Int. Cl.
*H02K 1/27* (2006.01)
*H02K 7/00* (2006.01)
*H02K 1/2706* (2022.01)

(52) U.S. Cl.
CPC ........... *H02K 1/2706* (2013.01); *H02K 7/003* (2013.01)

(58) Field of Classification Search
CPC .... H02K 1/2706; H02K 7/003; H02K 1/2766; H02K 2213/03
See application file for complete search history.

(56) References Cited

U.S. PATENT DOCUMENTS

| 9,780,613 | B2 | 10/2017 | Yamaguchi et al. | |
|---|---|---|---|---|
| 2012/0104891 | A1* | 5/2012 | Yamaguchi | H02K 1/276 310/156.53 |
| 2012/0256516 | A1* | 10/2012 | Matsushita | H02K 1/2766 310/216.123 |
| 2014/0225470 | A1* | 8/2014 | Yamaguchi | H02K 1/2766 310/156.53 |

FOREIGN PATENT DOCUMENTS

JP 2014-158331 A 8/2014

* cited by examiner

*Primary Examiner* — Tulsidas C Patel
*Assistant Examiner* — Riley Owen Stout
(74) *Attorney, Agent, or Firm* — Oblon, McClelland, Maier & Neustadt, L.L.P.

(57) ABSTRACT

A rotor core for a rotary electric machine, includes: a shaft hole into which a shaft rotating about a rotation axis is inserted and fixed; an inner ring portion provided with the shaft hole therein and having an outer edge in a circular shape coaxial with the rotation axis; an outer ring portion coaxial with the rotation axis and disposed radially outward of the inner ring portion; a connection ring portion coaxial with the rotation axis and disposed between the inner and outer ring portions; inner ribs interconnecting the inner and connection ring portions and extending in a crossing direction to the rotation axis; and outer ribs interconnecting the connection and outer ring portions and extending in the crossing direction. The inner and outer ribs are disposed respectively in different phases in a peripheral direction of the connection ring portion.

20 Claims, 3 Drawing Sheets

ROTOR CORE

CROSS REFERENCE TO RELATED APPLICATIONS

This application is based on and claims priority under 35 U.S.C. § 119 to Japanese Patent Application 2018-187633, filed on Oct. 2, 2018, the entire contents of which are incorporated herein by reference.

TECHNICAL FIELD

This disclosure relates to a rotor core for a rotary electric machine.

BACKGROUND DISCUSSION

A rotary electric machine includes a rotor in which a rotor core is formed by lamination or the like, a shaft which integrally rotates with the rotor, and a stator which generates a magnetic field to rotate the rotor by interaction with a magnetic field of the rotor. The rotor and the shaft of such a rotary electric machine are fixed and connected to each other by tightly fitting the shaft into a shaft hole formed in the rotor core by press-fitting or shrink-fitting. When the rotary electric machine is energized and the number of revolutions of the rotor increases, deformation such as radially outward expansion of the rotor core occurs by a centrifugal force. Therefore, there is a need to prevent deformation of the rotor core.

A rotor of a rotary electric machine is described in JP 2014-158331A (Reference 1). A rotor core of the rotor includes a through-hole having a substantially circular ring shape and axially formed from the inner circumferential side of a magnet insertion hole into which a permanent magnet is inserted, an inner circumferential side rotor core (corresponding to an inner ring portion herein) on the inner circumferential side of the through-hole, an outer circumferential side rotor core (corresponding to an outer ring portion herein) on the outer circumferential side of the through-hole, and a shaft hole formed in a central portion of the rotor core so that a rotor shaft is press-fitted into the shaft hole. A circular ring portion having a substantially circular ring shape (corresponding to a connection ring portion herein) is formed radially inward of the through-hole, and the inner circumferential side rotor core and the circular ring portion are connected to each other by a plurality of inner circumferential side ribs arranged at a predetermined distance in the peripheral direction. The outer circumferential side rotor core and the circular ring portion are connected to each other by a plurality of outer circumferential side ribs arranged at a predetermined distance in the peripheral direction. The inner circumferential side ribs and the outer circumferential side ribs are formed so as to be inclined radially outward in the peripheral direction. By setting the rigidity of each of the inner circumferential side ribs and the outer circumferential side ribs so as to obtain desired characteristics, press-fitting stress generated inside the rotor core when the shaft is press-fitted into the shaft hole, centrifugal stress generated inside the rotor core by a centrifugal force during rotor rotation, or the expansion of each of the outer circumferential side rotor core and the inner circumferential side rotor core caused by the press-fitting stress or the centrifugal stress may be controlled to fall within a predetermined condition. For example, since the outer circumferential side rotor core is located circumferentially outside the inner circumferential side rotor core at the time of rotation, a greater centrifugal force acts thereon compared to that in the inner circumferential side rotor core. Therefore, by setting the rigidity of the outer circumferential side ribs connected to the outer circumferential side rotor core to be greater than the rigidity of the inner circumferential side ribs, the inner circumferential side ribs may be easily deformed, so that displacement due to the centrifugal stress generated in the outer circumferential side rotor core at the time of rotation is absorbed by the deformation of the inner circumferential side ribs. Thus, deformation of the inner circumferential side rotor core is prevented.

In the rotor of the rotary electric machine described in Reference 1, the stress generated in the rotor core is relieved by adjusting the rigidity of each of the inner circumferential side ribs and the outer circumferential side ribs which are inclined radially outward in the peripheral direction. Thus, in order to secure the magnitude of relievable displacement, it is necessary to secure the lengths of the inner circumferential side ribs and the outer circumferential side ribs in the radial direction beyond a predetermined length. For this reason, a rotor core having a small thickness in the radial direction (a small difference between the inner and outer diameters thereof) may not be adapted. Further, the number of punching holes or the punching area for forming the inner circumferential side ribs and the outer circumferential side ribs is increased, which causes practical problems, for example, a difficulty in processing by an inexpensive processing method such as punching or an increase in price. For this reason, in the related art described in Reference 1, deformation of the rotor core may not be appropriately prevented.

Thus, a need exists for a rotor core for a rotary electric machine which is not susceptible to the drawback mentioned above.

SUMMARY

A feature of a rotor core for a rotary electric machine according to an aspect of this disclosure resides in that the rotor core includes a shaft hole into which a shaft that rotates about a rotation axis is inserted and fixed, an inner ring portion provided with the shaft hole therein and having an outer edge in a circular shape coaxial with the rotation axis, an outer ring portion coaxial with the rotation axis and disposed radially outward of the inner ring portion, a connection ring portion coaxial with the rotation axis and disposed between the inner ring portion and the outer ring portion, a plurality of inner ribs each interconnecting the inner ring portion and the connection ring portion and extending in a direction crossing the rotation axis, and a plurality of outer ribs each interconnecting the connection ring portion and the outer ring portion and extending in the direction crossing the rotation axis, in which the inner ribs and the outer ribs are disposed respectively in different phases in a peripheral direction of the connection ring portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A rotor core for a rotary electric machine according to an embodiment disclosed here will be described with reference to FIGS. 1 to 4. Further, the rotary electric machine mentioned herein includes all of an electric motor, a generator, and an electric generator that realizes functions of both the electric motor and the generator.

[Motor and Rotor]

Figure 1:
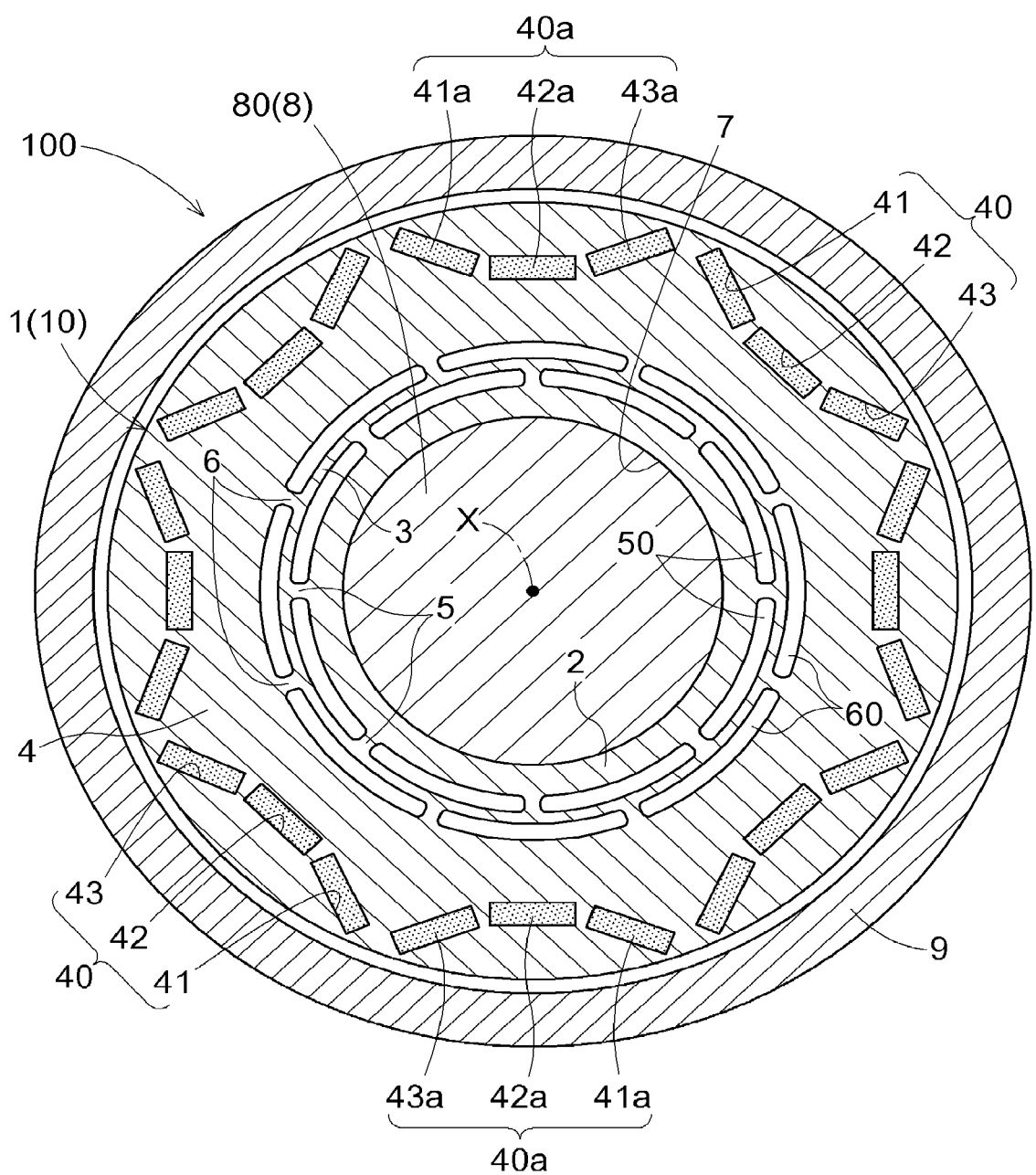
FIG. 1 is a cross-sectional view of a motor viewed in the axial direction of a shaft.
Figure 4:
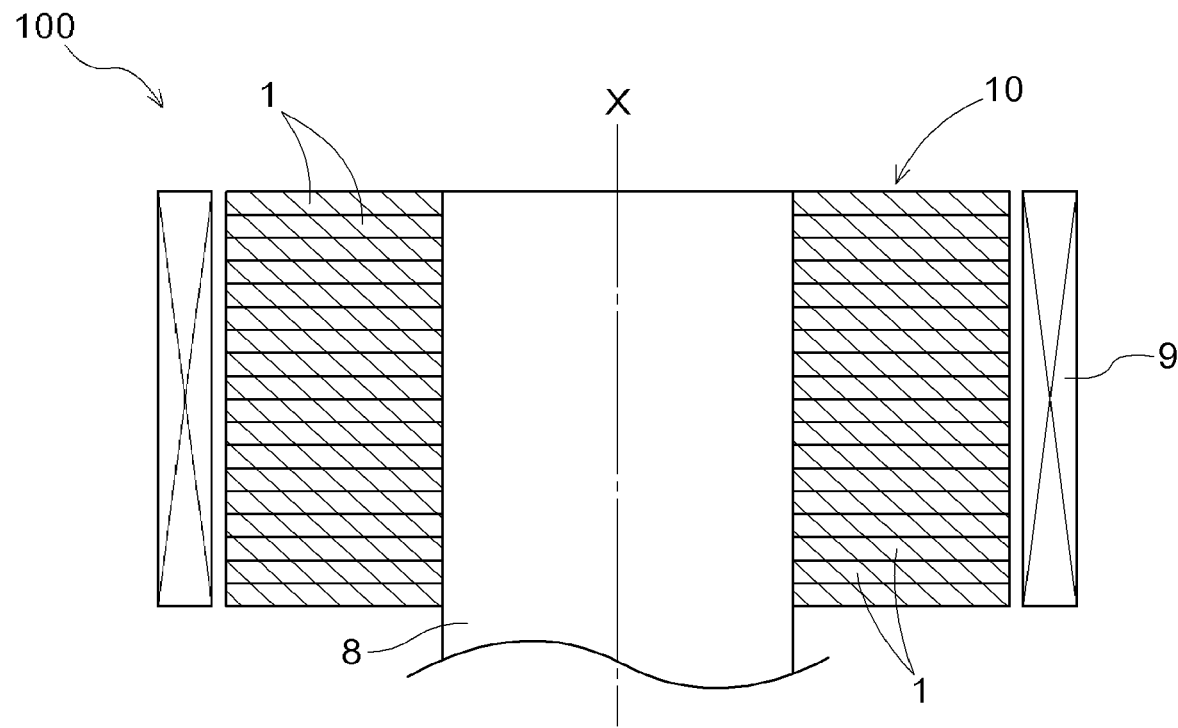
FIG. 4 is a cross-sectional view of the motor viewed in the radial direction of the shaft.

FIGS. 1 and 4 illustrate a motor 100 as an example of the rotary electric machine in which a rotor core 1 according to the present embodiment is adopted. The motor 100 according to the present embodiment is an interior permanent magnet synchronous motor (IPM motor) with magnets embedded therein. The motor 100 includes a cylindrical stator 9 in which electromagnets (not illustrated) are arranged in the peripheral direction and a rotor 10 inserted inside a cylinder of the stator 9 and having permanent magnets 40a in the peripheral direction. The motor 100 generates a rotating magnetic field in the stator 9 when energized and rotates the rotor 10 (the rotor core 1) by interaction between the rotating magnetic field and a magnetic field generated by the permanent magnets 40a of the rotor 10. In addition, in FIGS. 1 and 4, illustration of a casing of the motor 100 is omitted.

The rotor 10 includes the permanent magnets 40a, a cylindrical shaft 8 which rotates about a rotation axis X, and the rotor core 1 which has a plate shape and is supported by the shaft 8 to integrally rotate with the shaft 8 about the same axis as the rotation axis X. A plate surface of the rotor core 1 is orthogonal to the axial direction of the rotation axis X.

Hereinafter, the direction along the rotation axis X of the shaft 8 and the same direction as this direction are briefly described as the axial direction. Further, the peripheral direction of the shaft 8 and the same direction as this direction are briefly described as the peripheral direction. Furthermore, the radial direction of the shaft 8 and the same direction as this direction are briefly described as the radial direction. In the present embodiment, the peripheral direction and the radial direction of the shaft 8 and the peripheral direction and the radial direction of the rotor core 1 are the same direction, respectively.

[Rotor Core]

The rotor core 1 is a magnetic body formed to have a plate shape. In the present embodiment, the rotor core 1 is formed by punching a magnetic steel plate. A plurality of sheets of rotor core 1 are laminated in the axial direction to form the rotor 10 (see FIG. 4). The rotor 10 is integrally rotatably connected with the shaft 8 about the same axis as the rotation axis X of the shaft 8.

The rotor core 1 includes a shaft hole 7 into which the shaft 8 is inserted and fixed, an inner ring portion 2 having the shaft hole 7 in a center portion thereof, an outer ring portion 4 disposed radially outward of the inner ring portion 2, a connection ring portion 3 disposed between the inner ring portion 2 and the outer ring portion 4, a plurality of inner ribs 5 interconnecting the inner ring portion 2 and the connection ring portion 3, and a plurality of outer ribs 6 interconnecting the connection ring portion 3 and the outer ring portion 4. The inner ring portion 2, the inner ribs 5, the connection ring portion 3, the outer ribs 6, and the outer ring portion 4 are disposed in this order from the inner side to the outer side of the rotor core 1 (radially outward of the shaft 8). The inner ring portion 2, the connection ring portion 3, and the outer ring portion 4 are disposed to have the same axis as the rotation axis X.

[Shaft]

The shaft 8 is a power transmission mechanism that outwardly transmits a rotational force generated between the rotor core 1 and the stator 9. The shaft 8 has a fitting portion 80 connected to the rotor core 1. The fitting portion 80 is formed in a cylindrical shape having a center coinciding with the rotation axis X and has a circular cross section.

[Inner Ring Portion]

The inner ring portion 2 is a portion of the rotor core 1. The inner ring portion 2 is an annular plate having a circular outer edge, and the center of a ring is superimposed on the rotation axis X. The inner ring portion 2 has the shaft hole 7 in the center portion thereof. The plurality of inner ribs 5 are integrally connected to the outer circumference of the ring of the inner ring portion 2.

The shaft hole 7 is a through-hole having a circular cross section and is coaxially formed with the rotation axis X. The fitting portion 80 of the shaft 8 is inserted into and fixed to the shaft hole 7. The insertion and fixing of the fitting portion 80 to the shaft hole 7 may be performed by fastening the fitting portion 80 of the shaft 8 through the shaft hole 7. For example, the insertion and fixing may be performed by a press-fitting method of pushing and fixing the fitting portion 80 into and to the shaft hole 7. Further, for example, the insertion and fixing may be performed by a shrink-fitting method of fixing the fitting portion 80 to the shaft hole 7 by heating and expanding the inner ring portion 2 to enlarge the opening diameter of the shaft hole 7 to insert the fitting portion 80 into the shaft hole 7 and then cooling the inner ring portion 2 in the inserted state to reduce the opening diameter of the shaft hole 7.

[Outer Ring Portion]

The outer ring portion 4 is a portion of the rotor core 1. The outer ring portion 4 is an annular plate having a circular outer edge, and the center of a ring is superimposed on the rotation axis X. The outer ribs 6 are integrally connected to the inner circumference of the ring of outer ring portion 4. The outer ring portion 4 is provided in an outer circumferential portion thereof with a magnet seat portion 40 which is a through-hole in the direction along the rotation axis X into which the permanent magnets 40a are inserted and provided.

A plurality of magnetic seat portions 40 are equidistantly arranged in the peripheral direction. Each magnet seat portion 40 is provided in pair with another magnet seat portion 40 which is rotationally symmetric therewith about the rotation axis X. Each magnet seat portion 40 includes a first seat portion 41, a second seat portion 42, and a third seat portion 43 in order in the radial direction. The first seat portion 41 and the third seat portion 43 are provided plane-symmetric with each other about a virtual plane (not illustrated) which is parallel to the axial direction and contains the rotation axis X. The second seat portion 42 is disposed between the first seat portion 41 and the third seat portion 43 in the peripheral direction. The second seat portion 42 is disposed slightly radially inward of the first seat portion 41 and the third seat portion 43. In a pair of magnet seat portions 40 adjacent to each other in the peripheral direction, the first seat portion 41 of one magnet seat portion 40 is adjacent to the third seat portion 43 of the other magnet seat portion 40.

The permanent magnets 40a are inserted into the respective magnet seat portions 40 so as to be magnetized in the radial direction and to have alternately different magnetization directions in the peripheral direction. The center of a magnetic pole of each permanent magnet 40a inserted in a corresponding one of the plurality of magnet seat portions 40, i.e., the center of a magnetic pole generated in the rotor core 1 is superimposed on the rotation axis X. The permanent magnets 40a are inserted such that the outer circumferential side of an arbitrary magnet seat portion 40 is the S-pole when the outer circumferential side of an adjacent magnet seat portion 40 is the N-pole. Each permanent magnet 40a includes three permanent magnet pieces 41a, 42a and 43a provided in the order of the first seat portion 41, the second seat portion 42, and the third seat portion 43.

As described above, the outer ring portion 4 is provided on an outer circumferential portion thereof with a plurality of permanent magnets 40a, and the respective permanent magnets 40a are arranged so as to be magnetized in the radial direction and to have alternately different magnetization directions in the peripheral direction.

[Connection Ring Portion]

Figure 2:
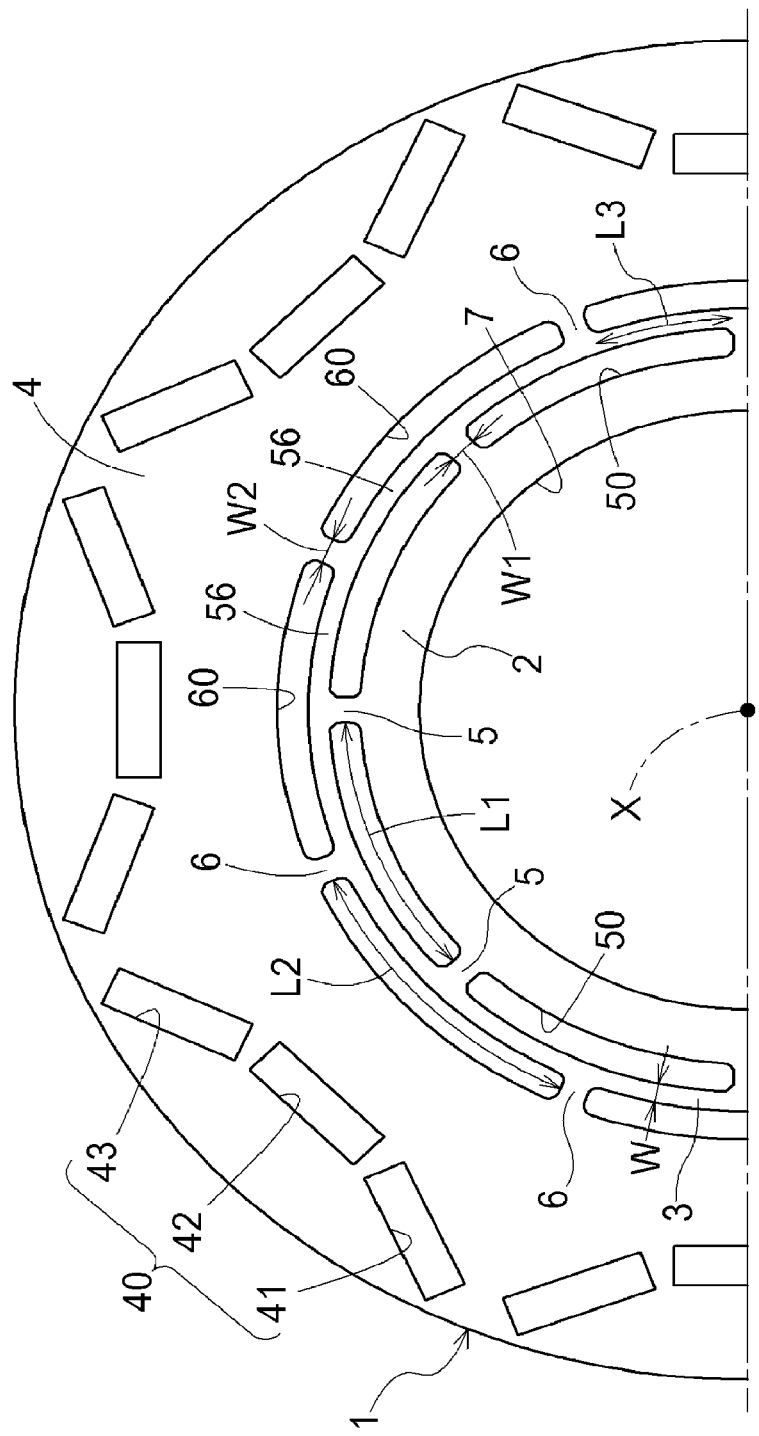
FIG. 2 is a partially enlarged view of a rotor core.

The connection ring portion 3 is a portion of the rotor core 1 as illustrated to FIGS. 1 and 2. The connection ring portion 3 is an annular plate, and the center of a ring is superimposed on the rotation axis X. The inner ribs 5 are integrally connected to the inner circumference of the ring of the connection ring portion 3. The outer ribs 6 are integrally connected to the outer circumference of the ring of the connection ring portion 3. The width W of the connection ring portion 3 in the radial direction (see FIGS. 2 and 3) is configured to be significantly less than the width of the inner ring portion 2 or the outer ring portion 4 in the radial direction.

[Inner Rib]

Figure 3:
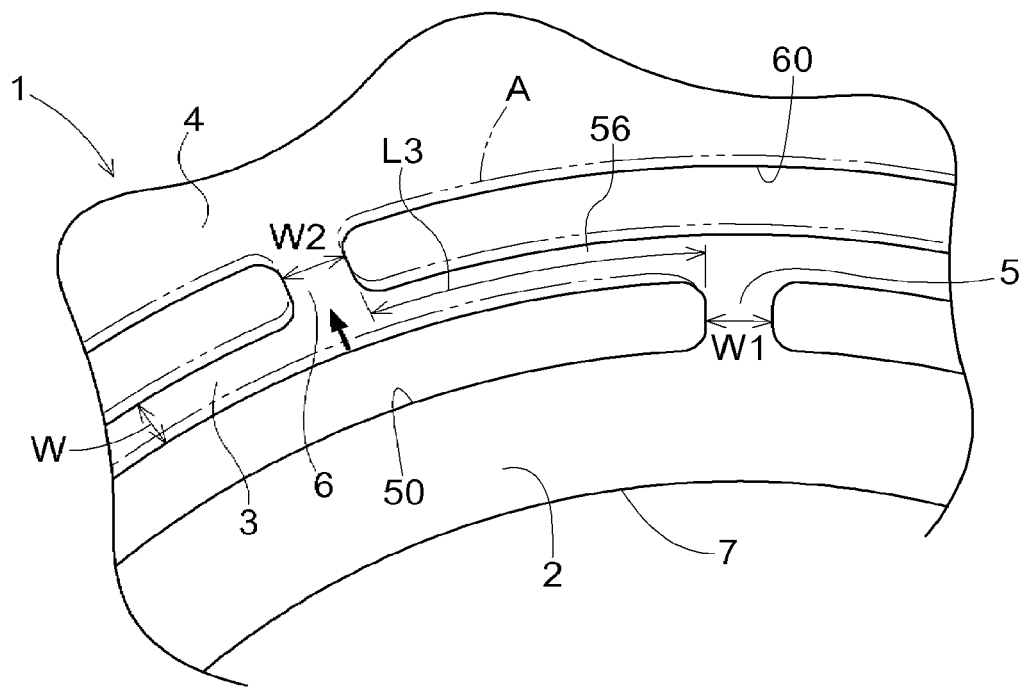
FIG. 3 is an explanatory view of an elastic portion.

The inner ribs 5 are a portion of the rotor core 1 as illustrated in FIGS. 1 and 2. The inner ribs 5 extend in the direction along the radial direction from the outer circumference of the inner ring portion 2 as a start point to the inner circumference of the connection ring portion 3 as an end point. In other words, the inner ribs 5 extend in the radial direction from the outer circumference of the inner ring portion 2 about the rotation axis X so as to extend across the range within which they reach the connection ring portion 3. The plurality of inner ribs 5 (e.g., an even number of eight inner ribs) are equidistantly arranged on the outer circumference of the inner ring portion 2 in the peripheral direction. In the present embodiment, each inner rib 5 is provided in pair with another inner rib 5 which is rotationally symmetric therewith about the rotation axis X. As illustrated in FIGS. 2 and 3, the width W1 of the inner rib 5 in the peripheral direction is configured to be greater than the width W of the connection ring portion 3 in the radial direction. In other words, the width W of the connection ring portion 3 in the radial direction is configured to be less than the width W1 of the inner rib 5 in the peripheral direction. In the present embodiment, both ends of the inner rib 5 in the peripheral direction are formed in parallel to each other.

As illustrated in FIGS. 1 and 2, an inner punching portion 50 is formed between a pair of adjacent inner ribs 5, the inner ring portion 2, and the connection ring portion 3. The inner punching portion 50 is a through-hole formed in the axial direction to take the form of a rectangle curved along the peripheral direction. Four corners of the inner punching portion 50 are formed in a chamfered shape. In the present embodiment, the four corners of the inner punching portion 50 are formed in an R-chamfered shape. The inner punching portion 50 is disposed alternately with the inner rib 5 in the radial direction.

As illustrated in FIGS. 2 and 3, the width L1 of the inner punching portion 50 in the peripheral direction is configured to be greater than the width W1 of the inner rib 5 in the peripheral direction. In other words, the width W1 of the inner rib 5 in the peripheral direction is configured to be less than the width L1 of the inner punching portion 50 in the peripheral direction. In addition, the width L1 is equal to the inner distance between the inner ribs 5 which are adjacent to each other in the peripheral direction.

In the present embodiment, the length of the inner rib 5 in the radial direction is configured to be greater than the width W1 of the inner rib 5 in the peripheral direction. Thus, when forming the inner punching portion 50 by punching or the like, processing precision and ease of a processing are improved.

[Outer Rib]

The outer ribs 6 are a portion of the rotor core 1 as illustrated to FIGS. 1 and 2. The outer ribs 6 extend in the direction along the radial direction from the outer circumference of the connection ring portion 3 as a start point to the inner circumference of the outer ring portion 4 as an end point. In other words, the outer ribs 6 extend in the radial direction from the outer circumference of the connection ring portion 3 about the rotation axis X so as to extend across the range within which they reach the outer ring portion 4. The plurality of outer ribs 6 (e.g., an even number of eight outer ribs) are equidistantly arranged on the outer circumference of the connection ring portion 3 in the peripheral direction. In the present embodiment, each outer rib 6 is provided in pair with another outer rib 6 which is rotationally symmetric therewith about the rotation axis X. In the present embodiment, both ends of the outer rib 6 in the peripheral direction are formed in parallel to each other.

As illustrated in FIGS. 2 and 3, the width W2 of the outer rib 6 in the peripheral direction is configured to be greater than the width W of the connection ring portion 3 in the radial direction. In other words, the width W of the connection ring portion 3 in the radial direction is configured to be less than the width W2 of the outer rib 6 in the peripheral direction.

As illustrated in FIGS. 1 and 2, an outer punching portion 60 is formed between a pair of adjacent outer ribs 6, the connection ring portion 3, and the outer ring portion 4. The outer punching portion 60 is a through-hole formed in the axial direction to take the form of a rectangle curved along the peripheral direction. Four corners of the outer punching portion 60 are formed in a chamfered shape. The outer punching portion 60 is alternately disposed with the inner rib 5 in radial direction.

As illustrated in FIGS. 2 and 3, the width L2 of the outer punching portion 60 in the peripheral direction is configured to be greater than the width W2 of the outer rib 6 in the peripheral direction. In other words, the width W2 of the outer rib 6 in the peripheral direction is configured to be less than the width L2 of the outer punching portion 60 in the peripheral direction. In addition, the width L2 is equal to the inner distance between the outer ribs 6 which are adjacent to each other in the peripheral direction.

In the present embodiment, the length of the outer rib 6 in the radial direction is configured to be greater than the width W2 of the outer rib 6 in the peripheral direction. Thus, when forming the outer punching portion 60 by punching or the like, processing precision and ease of a processing are improved.

[Description Related to Relationship Between Inner Rib and Outer Rib]

As illustrated in FIGS. 1 and 2, the inner ribs 5 and the outer ribs 6 are alternately arranged in the radial direction of the rotor core 1. In other words, the inner ribs 5 and the outer ribs 6 are disposed in different phases in the peripheral direction, and when viewed in the radial direction, the outer ribs 6 and the inner ribs 5 are not superimposed. The number of inner ribs 5 and the number of outer ribs 6 are the same. In addition, the distance L3 between the ribs illustrated in FIGS. 2 and 3 is the inner distance between the inner rib 5 and the outer rib 6 in the peripheral direction on the connection ring portion 3.

As illustrated in FIGS. 2 and 3, the distance L3 between the ribs is configured to be greater than the width W1 of the inner rib 5 in the peripheral direction and the width W2 of the outer rib 6 in the peripheral direction. In other words, the width W1 of the inner rib 5 in the peripheral direction and the width W2 of the outer rib 6 in the peripheral direction are configured to be less than the distance L3 between the ribs.

In addition, in the present embodiment, the width W2 of the outer rib 6 in the peripheral direction is configured to be the same as the width W1 of the inner rib 5 in the peripheral direction. In addition, the length of the inner rib 5 in the radial direction is the same as the length of the outer rib 6 in the radial direction.

[About Prevention of Deformation of Rotor Core]

Prevention of deformation of the rotor core 1 will be described with reference to FIG. 3. In FIG. 3, a bridge portion 56 is a portion of the connection ring portion 3 and is defined as a portion between a connecting portion of the connection ring portion 3 with the inner rib 5 and a connecting portion of the connection ring portion 3 with the outer rib 6. The length of the bridge portion 56 in the peripheral direction corresponds to the distance L3 between the ribs. Thus, the bridge portion 56 is configured so as to be longer in the peripheral direction than the width W1 of the inner rib 5 in the peripheral direction and the width W2 of the outer rib 6 in the peripheral direction. Further, since the width of the bridge portion 56 in the radial direction is the same as the width W of the connection ring portion 3 in the radial direction, the width of the bridge portion 56 in the radial direction is less than the width W1 of the inner rib 5 in the peripheral direction and the width W2 of the outer rib 6 in the peripheral direction.

One inner rib 5, one outer rib 6 adjacent to the one inner rib 5, and one bridge portion 56 between the inner rib 5 and the outer rib 6 form, as one unit, an integral cushion (elastic portion) that absorbs or relieves displacement in the radial direction to be described later.

Based on a relationship between the widths or the lengths of the bridge portion 56, the inner rib 5, and the outer rib 6, when the outer ring portion 4 is deformed radially outward by a centrifugal force and radially outward stress (hereinafter referred to as centrifugal stress) is transmitted from the outer ring portion 4 to the outer rib 6, the bridge portion 56 is deformed by the centrifugal stress so as to be curved radially outward using the connecting portion with the inner rib 5 as a fulcrum and the connecting portion with the outer rib 6 as a force point. Thus, transmission of displacement from the outer ring portion 4 to the inner ring portion 2 is blocked (prevented). In FIG. 3, the bridge portion 56 is pulled radially outward by the outer rib 6 and is deformed so that the connection side of the bridge portion 56 with the outer rib 6 is displaced radially outward as indicated by a virtual line A so as to absorb displacement of the outer ring portion 4. Thus, the diameter of the shaft hole 7 is enlarged by the centrifugal stress to prevent the fastened shaft 8 from loosening and to prevent phase shift with the stator 9 from occurring due to rotation.

Contrary to a case where the centrifugal stress is generated, when the shaft 8 is press-fitted or shrink-fitted into the shaft hole 7 in the inner ring portion 2 so that the inner ring portion 2 is deformed radially outward and radially inward stress (hereinafter referred to as diameter enlarging stress) is transmitted from the inner ring portion 2 to the inner rib 5, the bridge portion 56 is deformed by the diameter enlarging stress so as to be curved radially outward using the connecting portion with the outer rib 6 as a fulcrum and the connecting portion with the inner rib 5 as a force point. Thus, transmission of displacement from the inner ring portion 2 to the outer ring portion 4 is blocked (prevented). Although illustration of this case is omitted, the bridge portion 56 is urged radially outward by the inner rib 5 and is deformed so that the connection side of the bridge portion 56 with the inner rib 5 is displaced radially outward so as to absorb displacement of the outer ring portion 4 as in the illustration of FIG. 3. Thus, transmission of displacement from the inner ring portion 2 to the outer ring portion 4 is blocked (prevented). Thus, the radial distance between the stator 9 and the rotor 10 does not change, and motor characteristics do not change.

As described above, one inner rib 5, one outer rib 6 adjacent to the one inner rib 5, and one bridge portion 56 between the inner rib 5 and the outer rib 6 function as an integral cushion. Thus, even if the radially outward stress (e.g., the centrifugal stress) is generated in the outer ring portion 4, the stress is not transmitted with respect to the inner ring portion 2 or is blocked so that enlargement of the diameter of the shaft hole 7 is prevented. Thus, the occurrence of sliding between the shaft 8 and the rotor core 1 (the rotor 10) is prevented, or separation of the rotor core 1 (the rotor 10) from the shaft 8 is prevented.

Similarly, one inner rib 5, one outer rib 6 adjacent to the one inner rib 5, and one bridge portion 56 between the inner rib 5 and the outer rib 6 function as an integral cushion. Thus, even if the radially outward stress (e.g., the diameter enlarging stress) is generated in the inner ring portion 2, the stress is not transmitted with respect to the outer ring portion 4 or is blocked so that deformation of the outer ring portion 4 is prevented. Thus, problems such as phase shift of the magnetic field of the permanent magnets 40a disposed on the outer circumferential portion of the outer ring portion 4 and shaking of the center of a magnetic pole may be prevented.

As described above, the rotor core for the rotary electric machine in which deformation is prevented may be provided.

[Other Embodiments]

(1) In the above embodiment, a case where the width W2 of the outer rib 6 in the peripheral direction is configured to be the same width as the width W1 of the inner rib 5 in the peripheral direction has been described. However, the width W1 of the inner rib 5 in the peripheral direction and the width W2 of the outer rib 6 in the peripheral direction may differ from each other. For example, the width W2 of the outer rib 6 in the peripheral direction may be configured to be greater than (e.g., twice) the width W1 of the inner rib 5 in the peripheral direction.

(2) In the above embodiment, a case where the rotor 10 is formed by laminating a plurality of sheets of rotor core 1 has been described. However, the rotor 10 may be formed of one layer of rotor core 1.

(3) In the above embodiment, a case where the magnetic seat portion 40 includes the first seat portion 41, the second seat portion 42, and the third seat portion 43 in order in the radial direction and the permanent magnet 40a provided on the magnet seat portion 40 includes three permanent magnet pieces including the permanent magnet piece 41a, the permanent magnet piece 42a, and the permanent magnet piece 43a provided in the order of the first seat portion 41, the second seat portion 42, and the third seat portion 43 has been described. However, there may be a case where the magnet seat portion 40 includes one or two seat portions, or four or more seat portions, and a case where the permanent magnet 40a includes permanent magnet pieces corresponding to the number of the respective seat portions.

(4) In the above embodiment, a case where both ends of the inner rib 5 in the peripheral direction are formed in parallel to each other has been described. Further, a case where both ends of the outer rib 6 in the peripheral direction are formed in parallel to each other has been described. However, both ends of the inner rib 5 or the outer rib 6 in the peripheral direction may not be formed in parallel to each other. For example, both the ends may be directed radially outward so as to be away from each other, in other words, the inner rib 5 or the outer rib 6 may be shaped to be wider radially outward in the peripheral direction.

(5) In the above embodiment, a case where an even number of inner ribs 5 are equidistantly arranged in the peripheral direction on the outer circumference of the inner ring portion 2 and each inner rib 5 is provided in pair with another inner rib 5 which is rotationally symmetric therewith about the rotation axis X has been described. However, an odd number of inner ribs 5 (three or more inner ribs) may be provided as long as they are equidistantly arranged in the peripheral direction.

(6) In the above embodiment, a case where an even number of outer ribs 6 are equidistantly arranged in the peripheral direction on the outer circumference of the connection ring portion 3, and each outer rib 6 is provided in pair with another outer rib 6 which is rotationally symmetric therewith about the rotation axis X has been described. However, an odd number of outer ribs 5 (three or more inner ribs) may be provided as long as they are equidistantly arranged in the peripheral direction.

In addition, a configuration disclosed in the above embodiment (including other embodiments) may be applied in combination with a configuration disclosed in another embodiment so long as there is no contradiction. Further, the embodiment disclosed herein is merely given by way of example, and the embodiment of this disclosure is not limited thereto and may be appropriately modified within the range not departing from the gist of this disclosure.

This disclosure may be applied to a rotor core for a rotary electric machine.

A feature of a rotor core for a rotary electric machine according to an aspect of this disclosure resides in that the rotor core includes a shaft hole into which a shaft that rotates about a rotation axis is inserted and fixed, an inner ring portion provided with the shaft hole therein and having an outer edge in a circular shape coaxial with the rotation axis, an outer ring portion coaxial with the rotation axis and disposed radially outward of the inner ring portion, a connection ring portion coaxial with the rotation axis and disposed between the inner ring portion and the outer ring portion, a plurality of inner ribs each interconnecting the inner ring portion and the connection ring portion and extending in a direction crossing the rotation axis, and a plurality of outer ribs each interconnecting the connection ring portion and the outer ring portion and extending in the direction crossing the rotation axis, in which the inner ribs and the outer ribs are disposed respectively in different phases in a peripheral direction of the connection ring portion.

According to the above configuration, the rotor core rotates about the same axis as the rotation axis of the shaft. Then, according to the above configuration, a structure having an elastic deformation margin in the radial direction of the connection ring portion (equal to the radial direction of the rotor core) is formed by the inner ribs and the outer ribs adjacent to each other and a portion of the connection ring portion between the adjacent inner and outer ribs in the peripheral direction of the connection ring portion (equal to the peripheral direction of the rotor core). Hereinafter, the inner ribs, the outer ribs, and the portion of the connection ring portion between the adjacent inner and outer ribs which form the above structure may be described as an elastic portion. By elastic deformation of the elastic portion, transmission of displacement from one of the outer ring portion and the inner ring portion to the other one is prevented. Thus, deformation of the rotor core may be prevented. The elastic portion will be described later.

For example, even if the outer ring portion is deformed by the centrifugal force due to the rotation of the rotor core, the elastic portion absorbs displacement, thereby preventing deformation of the inner ring portion. Further, even if the inner ring portion is deformed by press-fitting the shaft into the shaft hole in the rotor core, the elastic portion prevents displacement, thereby preventing deformation of the outer ring portion.

Deformation of the elastic portion will be described in detail. When a connecting portion of the connection ring portion with each inner rib is set as one fulcrum and a connecting portion of the connection ring portion with each outer rib is set as the other fulcrum on the other side, a portion of the connection ring portion between these two fulcrums (hereinafter referred to as a bridge portion) may be deformed in the radial direction. By deformation of the bridge portion in the radial direction, displacement from one side to the other side of the outer ring portion or the inner ring portion in a direction along the radial direction is absorbed, which prevents deformation in a direction along the other radial direction.

According to the above configuration, the magnitude of rigidity or elasticity (hereinafter referred to as elasticity or the like) of the elastic portion in a direction along the radial direction or the amount of deformation of the elastic portion in the direction along the radial direction may be adjusted using at least one of the length of the bridge portion and the width of the bridge portion in the radial direction. For example, when it is desired to secure a greater amount of deformation of the elastic portion, the length of the bridge portion may be increased or the width of the bridge portion in the radial direction may be reduced. Therefore, a sufficient amount of deformation of the elastic portion in the direction along the radial direction may be secured without increasing the width (size) of the elastic portion in the direction along the radial direction. Further, the amount of deformation of the elastic portion may be adjusted without significantly changing the width of the elastic portion in the direction along the radial direction. Further, even when applied to a rotor core having a small thickness in the radial direction (a small difference in the inner and outer diameters thereof), it is possible to appropriately prevent deformation of the rotor core since the width of the elastic portion in the direction along the radial direction is easily reduced.

Another feature of the rotor core for the rotary electric machine according to the aspect of this disclosure resides in that a width of each of the plurality of inner ribs in the peripheral direction is less than an inner distance between the respective inner ribs adjacent to each other in the peripheral direction.

When the inner distance between the inner ribs is increased, the width of the bridge portion in the peripheral direction described above is increased. Therefore, according to the above configuration, by setting a greater width of the bridge portion in the peripheral direction than the width of the inner rib to reduce the elasticity or the like of the bridge portion, deformation of the elastic portion in the direction along the radial direction may be concentrated on the connection ring portion (bridge portion) other than the inner rib. In other words, the amount of deformation of the elastic portion in the direction along the radial direction may be secured as the amount of deformation of the connection ring portion and may also be adjusted.

Another feature of the rotor core for the rotary electric machine according to the aspect of this disclosure resides in that a width of each of the plurality of outer ribs in the peripheral direction is less than an inner distance between the respective outer ribs adjacent to each other in the peripheral direction.

When the inner distance between the outer ribs is increased, the width of the bridge portion in the peripheral direction described above is increased. Therefore, according to the above configuration, by setting a greater width of the bridge portion in the peripheral direction than the width of the outer rib to reduce the elasticity or the like of the bridge portion, deformation of the elastic portion in the direction along the radial direction may be concentrated on the connection ring portion (bridge portion) other than the outer rib. In other words, the amount of deformation of the elastic portion in the direction along the radial direction may be secured as the amount of deformation of the connection ring portion and may also be adjusted.

Another feature of the rotor core for the rotary electric machine according to the aspect of this disclosure resides in that the respective inner ribs are disposed symmetrically with respect to a center of a magnetic pole generated in the outer ring portion.

According to the above configuration, the center of the magnetic pole generated in the rotor core (the outer ring portion) is superimposed on the rotation axis of the rotor core or the shaft. Thus, the inner ribs are rotationally symmetrically disposed with respect to the rotation axis of the rotor core (the shaft). Thus, deformation may be evenly prevented on the periphery of the entire rotor core.

Another feature of the rotor core for the rotary electric machine according to the aspect of this disclosure resides in that the respective outer ribs are disposed symmetrically with respect to the center of the magnetic pole generated in the outer ring portion.

According to the above configuration, the center of the magnetic pole generated in the rotor core (the outer ring portion) is superimposed on the rotation axis of the shaft. Thus, the outer ribs are rotationally symmetrically disposed with respect to the rotation axis of the shaft. Thus, deformation may be evenly prevented on the periphery of the entire rotor core.

Another feature of the rotor core for the rotary electric machine according to the aspect of this disclosure resides in that a width of the connection ring portion in a radial direction is less than the width of each of the plurality of inner ribs in the peripheral direction.

According to the above configuration, by setting a smaller width of the connection ring portion in the radial direction than the width of the inner rib in the peripheral direction to reduce the elasticity or the like of the bridge portion, deformation of the elastic portion in the direction along the radial direction may be concentrated on the connection ring portion (bridge portion) other than the inner rib. In other words, the amount of deformation of the elastic portion in the direction along the radial direction may be secured as the amount of deformation of the connection ring portion and may also be adjusted.

Another feature of the rotor core for the rotary electric machine according to the aspect of this disclosure resides in that the width of the connection ring portion in the radial direction is less than the width of each of the plurality of outer ribs in the peripheral direction.

According to the above configuration, by setting a smaller width of the connection ring portion in the radial direction than the width of the outer rib in the peripheral direction to reduce the elasticity or the like of the bridge portion, deformation of the elastic portion in the direction along the radial direction may be concentrated on the connection ring portion (bridge portion) other than the outer rib. In other words, the amount of deformation of the elastic portion in the direction along the radial direction may be secured as the amount of deformation of the connection ring portion and may also be adjusted.

Another feature of the rotor core for the rotary electric machine according to the aspect of this disclosure resides in that the shaft hole is a through-hole having a circular cross section.

According to the above configuration, the shaft is integrally rotatably connected by a connection structure in which a fitting portion of the shaft having a circular cross section is tightly fitted into and fixed to the shaft hole having a circular cross section and formed in the rotor core by press-fitting or shrink-fitting. Here, in the rotor core of the above configuration, transmission of displacement caused by deformation occurring in the outer ring portion to the inner ring portion having the shaft hole is prevented. Therefore, even if deformation occurs in the outer ring portion by the centrifugal force due to the rotation of the rotor core, the influence on deformation of the inner ring portion or the shaft hole thereof is slight. Thus, even when the shaft and the rotor core are integrally rotatably connected to each other by press-fitting or shrink-fitting as described above, problems such as the occurrence of unintended sliding between the shaft hole and the fitting portion due to the enlarged diameter of the through-hole as the shaft hole and disconnection between the shaft hole and the fitting portion (e.g., separation of the fitting portion from the shaft hole) are prevented. Thus, the shaft and the rotor core may be connected to each other by a simple connection structure such as press-fitting or shrink-fitting without using a key or key groove, and the connection state may be stably maintained even when the rotor core is rotated.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rotor core for a rotary electric machine, the rotor core comprising:
   a shaft-fastening hole provided at a center of the rotor core into which a shaft that rotates about a rotation axis is inserted and fixed;
   an inner ring portion provided with the shaft hole therein and having an outer edge in a circular shape coaxial with the rotation axis;
   an outer ring portion coaxial with the rotation axis and disposed radially outward of the inner ring portion;
   a connection ring portion coaxial with the rotation axis and disposed between the inner ring portion and the outer ring portion;
   a plurality of inner ribs each interconnecting the inner ring portion and the connection ring portion, each of the plurality of inner ribs extends from an outer circumference of the inner ring to the connection ring in a respective radial direction crossing the rotation axis; and
   a plurality of outer ribs each interconnecting the connection ring portion and the outer ring portion, each of the plurality of outer ribs extends from an outer circumference of the connection ring to an inner circumference of the outer ring in a respective radial direction crossing the rotation axis,
   wherein the inner ribs and the outer ribs are disposed respectively in different phases in a peripheral direction of the connection ring portion.

2. The rotor core according to claim 1, wherein a width of each of the plurality of inner ribs in the peripheral direction is less than an inner distance between the respective inner ribs adjacent to each other in the peripheral direction.

3. The rotor core according to claim 2, wherein a width of each of the plurality of outer ribs in the peripheral direction is less than an inner distance between the respective outer ribs adjacent to each other in the peripheral direction.

4. The rotor core according to claim 3, wherein the respective inner ribs are disposed symmetrically with respect to a center of a magnetic pole generated in the outer ring portion.

5. The rotor core according to claim 4, wherein the respective outer ribs are disposed symmetrically with respect to a center of the magnetic pole generated in the outer ring portion.

6. The rotor core according to claim 5, wherein a width of the connection ring portion in a radial direction is less than a width of each of the plurality of inner ribs in the peripheral direction.

7. The rotor core according to claim 6, wherein the width of the connection ring portion in the radial direction is less than a width of each of the plurality of outer ribs in the peripheral direction.

8. The rotor core according to claim 7, wherein the shaft hole is a through-hole having a circular cross section.

9. The rotor core according to claim 2, wherein the respective inner ribs are disposed symmetrically with respect to a center of a magnetic pole generated in the outer ring portion.

10. The rotor core according to claim 9, wherein the respective outer ribs are disposed symmetrically with respect to a center of the magnetic pole generated in the outer ring portion.

11. The rotor core according to claim 2, wherein the respective outer ribs are disposed symmetrically with respect to a center of the magnetic pole generated in the outer ring portion.

12. The rotor core according to claim 1, wherein a width of each of the plurality of outer ribs in the peripheral direction is less than an inner distance between the respective outer ribs adjacent to each other in the peripheral direction.

13. The rotor core according to claim 12, wherein the respective inner ribs are disposed symmetrically with respect to a center of a magnetic pole generated in the outer ring portion.

14. The rotor core according to claim 12, wherein the respective outer ribs are disposed symmetrically with respect to a center of the magnetic pole generated in the outer ring portion.

15. The rotor core according to claim 1, wherein the respective inner ribs are disposed symmetrically with respect to a center of a magnetic pole generated in the outer ring portion.

16. The rotor core according to claim 15, wherein the respective outer ribs are disposed symmetrically with respect to a center of the magnetic pole generated in the outer ring portion.

17. The rotor core according to claim 1, wherein the respective outer ribs are disposed symmetrically with respect to a center of the magnetic pole generated in the outer ring portion.

18. The rotor core according to claim 1, wherein a width of the connection ring portion in a radial direction is less than a width of each of the plurality of inner ribs in the peripheral direction.

19. The rotor core according to claim 1, wherein the width of the connection ring portion in the radial direction is less than a width of each of the plurality of outer ribs in the peripheral direction.

20. The rotor core according to claim 1, wherein the shaft hole is a through-hole having a circular cross section.

* * * * *